May 29, 1962   J. H. THUERMAN   3,036,695
CHAIN AND THREADED PIN
Filed July 16, 1958

INVENTOR.
JOHN H. THUERMAN
BY
Ernest W. Schultz
ATTORNEY 3,036,695
CHAIN AND THREADED PIN
John H. Thuerman, West Allis, Wis., assignor to Chain Belt Company, Milwaukee, Wis., a corporation of Wisconsin
Filed July 16, 1958, Ser. No. 748,867
1 Claim. (Cl. 198—189)

This invention relates to chains and particularly to means for endwise securement of the pin which connects adjacent links for their relative pivotal movement or articulation to allow the chain to wrap around and operate over a sprocket. In such chain, the pin may have a tight fit in the supporting bearings of one link while being turnable in the live bearing of the other link. However, wear, tension on the chain and expansion of the material of the links tends to enlarge the bearings so that the tight fit referred to cannot be relied upon to keep the pin in place. Positive securement of the pin is almost always necessary and is accomplished by various means such as heading of the pins, or by the use of cotters, clips and the like.

However, in many instances, such means are not feasible because of the materials, dimensions or design of the chain, or are not desirable because of the difficulty or delay involved in removal of the pin as for replacement of all or part of the chain.

The present invention provides a novel means of securing the pin against endwise movement and which is applicable to endless conveyor or power transmission chain operating on one direction only over a driving sprocket.

In a preferred embodiment of the invention, the body of the pin is freely turnable in the live bearings of one link and the ends of the pin are carried in the supporting bearings of the adjacent link. One of said ends of the pin is threaded in its bearing and the bearing carrying the other plain ends of the pin is provided with an abutment preventing the pin from passing through the bearing.

The pin is assembled in the aligned bearings by inserting the plain end in the bearing for the threaded end and then pushing the pin in the direction of the abutment. When the threaded end of the pin enters its bearing, rotation of the pin occurs in a given direction.

According to the invention, no further securement of the pin is required for operation of the chain over a driving sprocket provided the chain is not "turned over" on the sprockets, either direction of operation being such that the rotational forces applied to the pin by the live bearing tend to rotate the pin in the direction mentioned. This rotational force holds the pin against the abutment and so prevents endwise movement of the pin in either direction. The abutment only partially closes the end of the bearing so that a tool can be inserted therein and against the plain end of the pin to drive the pin away from the abutment for easy removal of the pin at any time.

A principal object of the invention is to provide for the adequate securement of the pin without positive securement means which require the ends of the pins to project from the links.

Another object of the invention is to provide for the inexpensive securement of the pin without interlocking means which must be first removed to allow removal of the pin from the link.

Another object is to provide an improved securement of the connecting pins for conveyor chain operating in one direction and which allows removal of the pin without special tools or the like.

Another object is to provide securement of the pin in plastic links which does not require deformation of the link which would weaken the link or fail to secure the pin after some wearing has occurred.

Another object is to ensure such securement of the pin notwithstanding substantial enlargement of the bearings due to wear or expansion of the material of the links.

Another object is to provide securement of the pins which does not require carefully maintained dimensions of the pin and link.

The drawings furnished herewith illustrate the best mode of carrying out the invention as presently contemplated and set forth herein.

Figure 1:
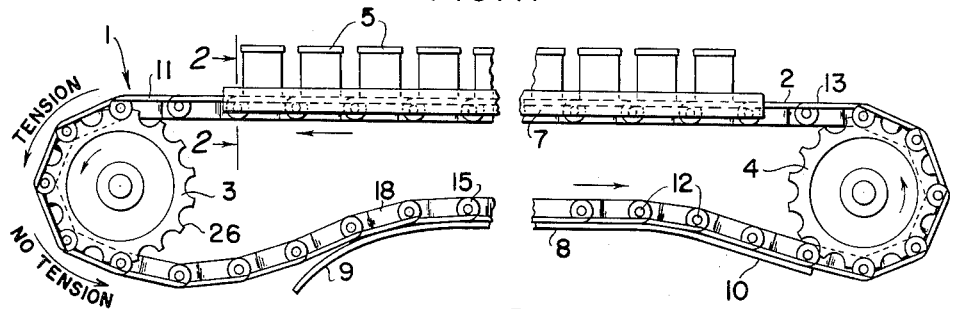
FIGURE 1 is a side view of a conveyor carrying a number of articles and operating over a driving sprocket and a driven tail sprocket.
Figure 2:
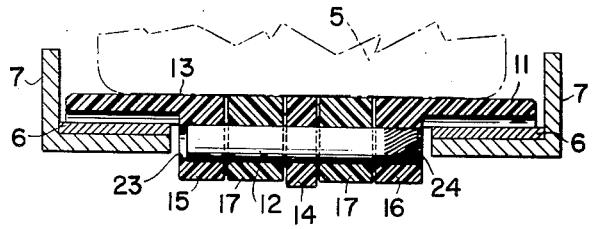
FIG. 2 is an enlarged cross-section of the upper run of the conveyor taken on lines 2—2 of FIG. 1 and showing the interfitting eyes or knuckles of adjacent links connected by the pin.
Figure 3:
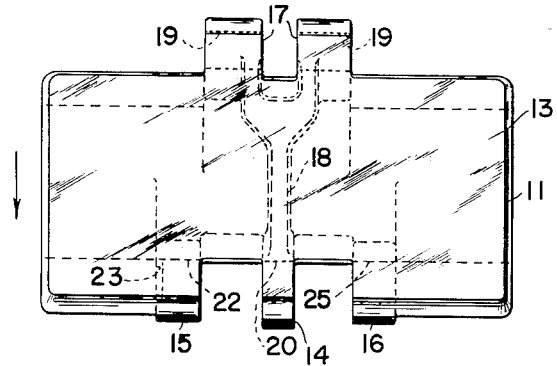
FIG. 3 is an enlarged plan view of a single link.
Figure 4:
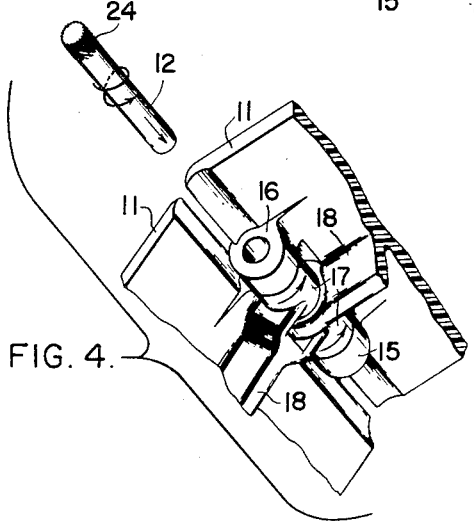
FIG. 4 is an enlarged view of portions of two links with the pin in position for assembly therewith.
Figure 5:
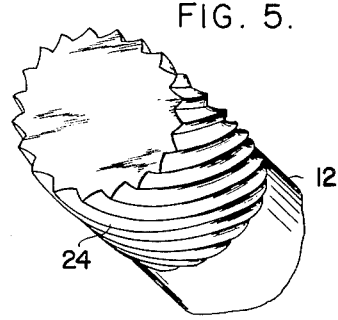
FIG. 5 is an enlarged view of the threaded end of the pin.

The conveyor 1 includes the chain 2 operating over the drive sprocket 3 and driven tail sprocket 4. The upper working run of chain 2 carries the articles 5 to be conveyed and slides on the wear strips 6 of the guide rails 7 as shown in FIG. 2. The lower return run of chain 2 is supported by the lower rail 8 having downwardly turned ends 9 and 10.

Chain 2 comprises the links 11 and the connecting pins 12 which connect the links for articulation. In the embodiment of the invention shown, each link 11 is an integrally formed plastic member having a flat upper body 13 providing with adjacent links a co-planar flat upper surface for the support of articles 5 and the like.

The interfitting eyes or knuckles of each two adjacent links which carry a pin 12 include the center knuckle 14, the outer knuckles 15 and 16 respectively, and the opposite knuckles 17 which fit between the corresponding knuckles 14, 15 and 16 of the adjacent link. The reinforcing rib 18 connecting the knuckle 14 and the knuckles 17 is integrally formed with the body 13 of the link to reinforce the same and is intended to carry a substantial share of the tension imposed upon the chain as described and claimed in the copending application of Philip J. Imse, Serial No. 499,875 and filed April 7, 1955 for Plastic Flat Top Conveyor.

The pins 12 are disposed in the several aligned bores or bearings of the interfitting eyes or knuckles to form the joints of the chain. The center portion of the pin is supported in the bore or bearing 20 of knuckle 14 and the bore or bearings 19 of knuckles 17 allow pin 12 to turn therein and form the live bearing of the chain joint.

The plain end of pin 12 is carried in bore or bearing 22 of knuckle 15 which is formed to include the annular abutment 23 partially closing the end of bearing 22. The opposite end of the pin is provided with the threads 24 by knurling or other method and the threads fit or form corresponding threads in the bore or bearing 25 of knuckle 16.

The links 11 of the chain are assembled merely by inserting the plain end of each pin in a knuckle 16 and pushing the pin through the aligned bearings of the interfitting knuckles until the plain end of the pin engages the corresponding abutment 23. A light press-fit of the pin in bearings 19 and 20 is recommended, but not necessary and the bearing 25 may be threaded to receive the threaded end of the pin. By providing pins 12 with spiral knurls which have fairly sharp corners and a low pitch, the pins readily form their own threads in the plastic material of the links 11.

In the operation of conveyor 1, chain 2 formed by links 11 is driven by the rotation of sprocket 3 having teeth 26 which fit and engage the knuckles on each side of the rib 18 of each link 11. For various operational advantages, sprockets 3 and 4 are spaced to allow chain 2 some slack which appears between the driving sprocket 3 and the end 9 of the lower rail 8 where the chain is under no tension except that of its own weight. The driving force which is applied to chain 2 by the teeth 26 of sprocket 3 places the link in last engagement with the sprocket under the greatest tension. As a given link is carried around the driving sprocket the tension is relieved by the engagement of the teeth of the driving sprocket with the succeeding links and the pressure applied to each pin by the several bearings of the links is subject to the same relief until the link reaches the slack part of the chain where the bearings are under no load. As is known, prolonged operation of the chain will result in wear between bearings 20, 22 and 25 and the pin.

While the use of certain plastics for the material of the links may practically eliminate such wear, the plastic will yield over a period of time and relax its securement of the pin. A more immediate problem is due to the high coefficient of expansion of such plastics and also their tendency to grow with their absorption of water. This results is greatly enlarged bearings 20, 22 and 25 so that the pin is as loose as it should be in the live bearings 19. It should be understood that the bearings 20, 22 and 25 can not be made so much the smaller than the pin so that the expansion referred to still leaves the pin secured. If the temperature of the plastic is then too low, assembly of the pins without breakage of the links is almost impossible, and, if it is accomplished, the tensile strength of the chain may be seriously affected.

As a further matter, frictional securement of the pin requires the maintenance of close tolerances in the fit between the links and the pin to avoid the same difficulties. While the frictional securement of the pin in bearings 20, 22 and 25 prevails, the pin cannot rotate or move endwise in these bearings as the links wrap around and unwrap from sprockets. However, it is found that friction in the live bearings 19 will prevail over the frictional securement of the pin in its supporting bearings 20, 22 and 25 only when the pin and bearings are under load which occurs only when the links are wrapping around the drive sprocket 3. As the links unwrap from sprocket 3, the nominal friction in the live bearings when the bearings are not under load is assumed to be insufficient to cause the pin to rotate in the supporting bearings. The opposite is not found to apply as the links wrap around and unwrap from tail sprocket 4 because the chain is there in both cases only under the relatively minor tension which is due to the friction of the chain moving over the lower rail 8. Accordingly, if the pin 11 rotates in bearings 20, 22 and 25 it tends to do so in one direction only as long as the chain articulates under tension over the drive sprocket in a given direction. The chain may drive the sprocket as well as may be driven by the sprocket and provided the chain is not "turned over," the increments of rotation of the pin are greater in one direction only, so that the general rotation in that direction is sufficient to hold the pin against the abutment. By making threads 24 with the proper rotational sense with respect to the direction of chain movement, the tendency referred to is adequate to secure the pin with respect to the links if and/or when the pin becomes loose in its supporting bearings. If the plain end of pin 11 is in contact with abutment 23, such rotation is prevented and the tendency to rotate in the direction referred to secures the pin against the abutment.

If the plain end of the pin is not in direct contact with abutment 23, such rotation will move the pin toward the abutment until such contact is established.

In holding the pin against the abutment, the pin is secured against endwise displacement in chain operation, but remains readily removable when the chain is not in operation. A simple tool, not shown, engaging the plain end of the pin is all that is required for removal of the pin to open the chain.

The knurled pin is inexpensive and readily forms its own threads in most plastics suitable for chain applications. The abutment for the pin is readily provided integrally with each link and the assembly of the chain involves no more than pushing each pin into place as described.

Various modes of carrying out the invention are contemplated as within the scope of the following claim particularly pointing out and distinctly claiming the subject matter which is regarded as the invention.

I claim:

In an articulated conveyer chain adapted to wrap around and operate over a cooperating driving sprocket and presenting on its sprocket engaging side only a sprocket tooth engaging surface and on its other side a material engaging surface, a series of hingedly interconnected links, each link comprising a body forming on one side a material engaging element and having depending from opposite edges of its other side sprocket tooth engaging apertured knuckles, two of said knuckles at one edge being spaced to receive between them a knuckle on the opposite edge of an adjacent link with their respective apertures in pin receiving alignment, and a cooperating chain pin received within said aligned apertures in a manner to hingedly interconnect said adjacent links, said chain pin being provided with and retained by helical lands projecting from the portion of its periphery that engages one of said spaced knuckles, said helical lands forming and removably engaging complementary helical grooves in said one of said spaced knuckles when said pin is pressed with turning motion through said aligned apertures, the other of said spaced knuckles having abutment means engaged by said pin when said pin is pressed into position in said aligned apertures, said helical lands being wrapped in such direction upon said pin that when adjacent hingedly interconnected links articulate from aligned relationship under tension the frictional turning forces exerted upon said pin tend to turn said pin into engagement with said abutment means, the arrangement being such that when said chain runs onto a driving sprocket under tension the inwardly flexing actions of successive links tend to turn their interconnecting pins in the direction urging them into engagement with said abutment means whereas outward flexing occurs when said chain runs off of the driving sprocket in slack condition with minimum tendency to turn said pins in the opposite direction, whereby said chain pins are urged continuously into operating position against said abutment means whenever said chain is running over the sprocket thereby retaining said pins and obviating the possibility that they might creep out of position during operation of the conveyer.

(References on following page)

References Cited in the file of this patent

UNITED STATES PATENTS

| | | |
|---|---|---|
| 304,625 | Doubleday | Sept. 2, 1884 |
| 1,482,151 | Rosenberg | Jan. 29, 1924 |
| 1,804,701 | Mojonnier | May 12, 1931 |
| 2,891,895 | Nagel | Dec. 20, 1932 |
| 2,119,334 | Leffler | May 31, 1938 |
| 2,452,173 | Zwiebel | Oct. 26, 1948 |
| 2,852,129 | Conner | Sept. 16, 1958 |
| 2,853,861 | Bremer et al. | Sept. 30, 1958 |
| 2,911,091 | Imse | Nov. 3, 1959 |

FOREIGN PATENTS

| | | |
|---|---|---|
| 786,836 | Great Britain | Nov. 27, 1957 |

OTHER REFERENCES

Du Pont Product Engineering Bulletin, volume or series 2 of 1955; apparent publishing date May 1955; page 7 relied upon.